United States Patent
Le Sage

(10) Patent No.: US 8,514,145 B2
(45) Date of Patent: Aug. 20, 2013

(54) ANTENNA IDENTIFICATION MODULE

(76) Inventor: Hendrikus A. Le Sage, Sprang-Capelle (NL)

( * ) Notice: Subject to any disclaimer, the term of this patent is extended or adjusted under 35 U.S.C. 154(b) by 477 days.

(21) Appl. No.: 12/816,150

(22) Filed: Jun. 15, 2010

(65) Prior Publication Data

US 2011/0140990 A1   Jun. 16, 2011

Related U.S. Application Data

(60) Provisional application No. 61/187,129, filed on Jun. 15, 2009.

(51) Int. Cl.
*G01R 29/08* (2006.01)
*H01Q 1/42* (2006.01)

(52) U.S. Cl.
USPC .......................... 343/894; 343/702; 343/872

(58) Field of Classification Search
USPC .................. 343/702, 894, 703, 872, 890, 891
See application file for complete search history.

(56) References Cited

U.S. PATENT DOCUMENTS

| | | | |
|---|---|---|---|
| 4,689,556 A | 8/1987 | Cedrone | |
| 4,739,448 A | 4/1988 | Rowe et al. | |
| 5,165,109 A | 11/1992 | Han et al. | |
| 5,523,761 A | 6/1996 | Gildea | |
| 5,604,506 A | 2/1997 | Rodal | |
| 5,864,318 A | 1/1999 | Cozenza et al. | |
| 6,252,553 B1 | 6/2001 | Solomon | |
| 6,320,898 B1 | 11/2001 | Newson et al. | |
| 6,418,031 B1 | 7/2002 | Archambeault | |
| 6,516,271 B2 | 2/2003 | Upadhyaya et al. | |
| 6,549,835 B2 | 4/2003 | Deguchi | |
| 6,774,843 B2 | 8/2004 | Takahashi | |
| 6,822,314 B2 | 11/2004 | Beasom | |
| 6,900,992 B2 | 5/2005 | Kelly et al. | |
| 7,006,032 B2 | 2/2006 | King et al. | |

(Continued)

FOREIGN PATENT DOCUMENTS

| | | |
|---|---|---|
| DE | 202005019697 | 3/2006 |
| EP | 2003731 | 12/2008 |
| WO | WO-2006056886 | 6/2006 |
| WO | WO-2007113334 | 10/2007 |

OTHER PUBLICATIONS

"International Search Report and Written Opinion", PCT/IB2010/001721, (Nov. 11, 2010).

(Continued)

*Primary Examiner* — James H Cho
(74) *Attorney, Agent, or Firm* — Law Office of Mark Brown LLC; Mark E Brown; Christopher M. DeBacker

(57) ABSTRACT

A system and method for detecting and reporting telecommunications antenna identification data to a remote user location is presented. A telecommunications antenna module is provided for storing and transmitting antenna serial number, part number, version, firmware, production date, and other relevant data to a network operator over AISG and/or 3 GPP compliant communications systems. The module consists of a printed circuit board mounting a programmable device capable of storing and transmitting programmed antenna information. The module is adapted for connecting to antenna communications cables using either AISG cable splitter or in-line in a daisy chain fashion. The module is capable of connecting in-line with another antenna monitoring device to connect to the antenna. The device is programmed either in the field by a field technician or by the antenna manufacturer.

11 Claims, 6 Drawing Sheets

(56) References Cited

U.S. PATENT DOCUMENTS

| | | |
|---|---|---|
| 7,089,099 B2 | 8/2006 | Shostak et al. |
| 7,224,246 B2 | 5/2007 | Thomas |
| 8,018,390 B2 | 9/2011 | Davidson et al. |
| 8,027,703 B2 * | 9/2011 | Girard et al. ............... 455/562.1 |
| 2001/0033247 A1 * | 10/2001 | Singer et al. ................. 342/359 |
| 2005/0174297 A1 | 8/2005 | Cake |
| 2005/0225955 A1 | 10/2005 | Grebenkemper et al. |
| 2007/0161348 A1 | 7/2007 | Gribben et al. |
| 2007/0285308 A1 | 12/2007 | Bauregger et al. |
| 2009/0141623 A1 | 6/2009 | Jung et al. |
| 2010/0113097 A1 * | 5/2010 | Seeor et al. ................ 455/562.1 |
| 2010/0117914 A1 | 5/2010 | Feller et al. |

OTHER PUBLICATIONS

"International Preliminary Report on Patentability and Written Opinion", PCT/IB2010/001721, (Dec. 29, 2011).

"International Search Report and Written Opinion", PCT/IB2008/003796,, (Jul. 15, 2009).

Yang, F. et al., "A single layer dual band circularly polorized micropstrip antenna for GPS application", *IEEE Antenna and Propagation Society International Symposium*, vol. 4. pp. 720-723, Jun. 2002.

Padhi, K. et al., "An EM-coupled dual-polarized microstrip patch antenna for RFID applications", *Microwave and optical technology letter*, vol. 39., No. 5, pp. 345-360, 2003.

Richter, Paul H., et al., "Improved Blind Pointing of NASA's Beam-Waveguide Antennas for Millimeter Wave Operation", *Jet Propulsion Lab Technical Report Series 1992*. Published Apr. 4, 2000.

"KMW Communications", *PAC (Portable Antenna Controller)*; http://www.kmwcomm.com.

"International Search Report", PCT/US09/33567, (Feb. 9, 2009).

"International Search Report / Written Opinion", PCT/US09/63594, (Jan. 11, 2010).

"RFS Product Preview", *RFS Product Brochure*, (Dec. 22, 2008), 1 of 1.

\* cited by examiner

ANTENNA IDENTIFICATION MODULE

This application claims priority in U.S. Provisional Patent Application No. 61/187,129, filed Jun. 15, 2009, which is incorporated herein by reference

BACKGROUND OF THE INVENTION

1. Technical Field

The present disclosed technology relates generally to antennas, and in particular to an electronic antenna identification module for telecommunications antennas.

2. Description of the Related Art

Telecommunications antennas that are compliant with the industry standardized Antenna Interface Standards Group (ASIG) protocol (specifications for the control and interface of antennas with digital remote control and monitoring capabilities) and the $3^{rd}$ Generation Partnership Project (3GPP) (standard for global third generation (3G) mobile telephone system specifications) electronically communicate antenna information to network operators and enable remote control and monitoring through communications cables attached to the antennas. Such antennas consist of the antenna itself, and associated internal and external components. Current generation antennas are capable of communicating information about internal and external components such as: mechanical and electrical azimuth measurement and control; and the serial number, part number, version, firmware, production date, etc. associated with the respective internal and external components. However, current generation antennas are incapable of electronically communicating information about the antenna itself such as serial number, part number, version, firmware, production date, etc. What is needed is a AISG and 3GPP compliant antenna identification module capable of storing relevant antenna information for communication over the standardized AISG and 3GPP protocols.

Heretofore has not been available an antenna identification module with the advantages and features of the disclosed subject matter.

SUMMARY OF THE INVENTION

A telecommunications antenna identification module is provided for storing and transmitting antenna serial number, part number, version, firmware, production date, etc. to a network operator over AISG and 3 GPP compliant communications systems. The module consists of a printed circuit board mounting a programmable device capable of storing and transmitting programmed antenna information. The module is adapted for connecting to antenna communications cables using either AISG cable splitter or in-line in a daisy chain fashion. The device is programmed either in the field by a field technician or by the antenna manufacturer.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. Said terminology will include the words specifically mentioned, derivatives thereof and words of similar meaning.

II. Embodiment of the Antenna Identification Module 2

Figure 1:
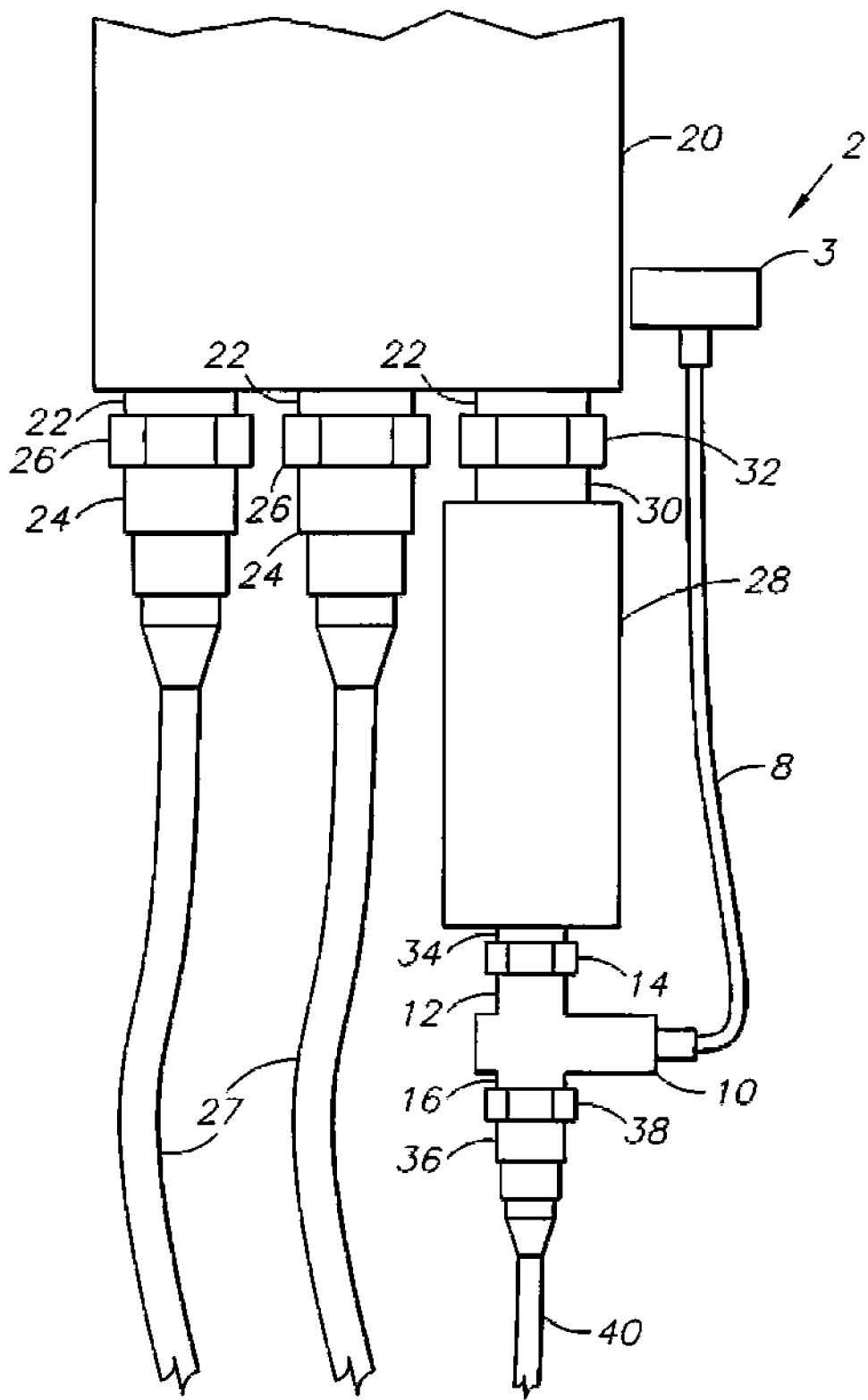
FIG. 1 is a side elevational view of an antenna identification module embodying the principles of the disclosed subject matter connected to a telecommunications antenna.
Figure 2:
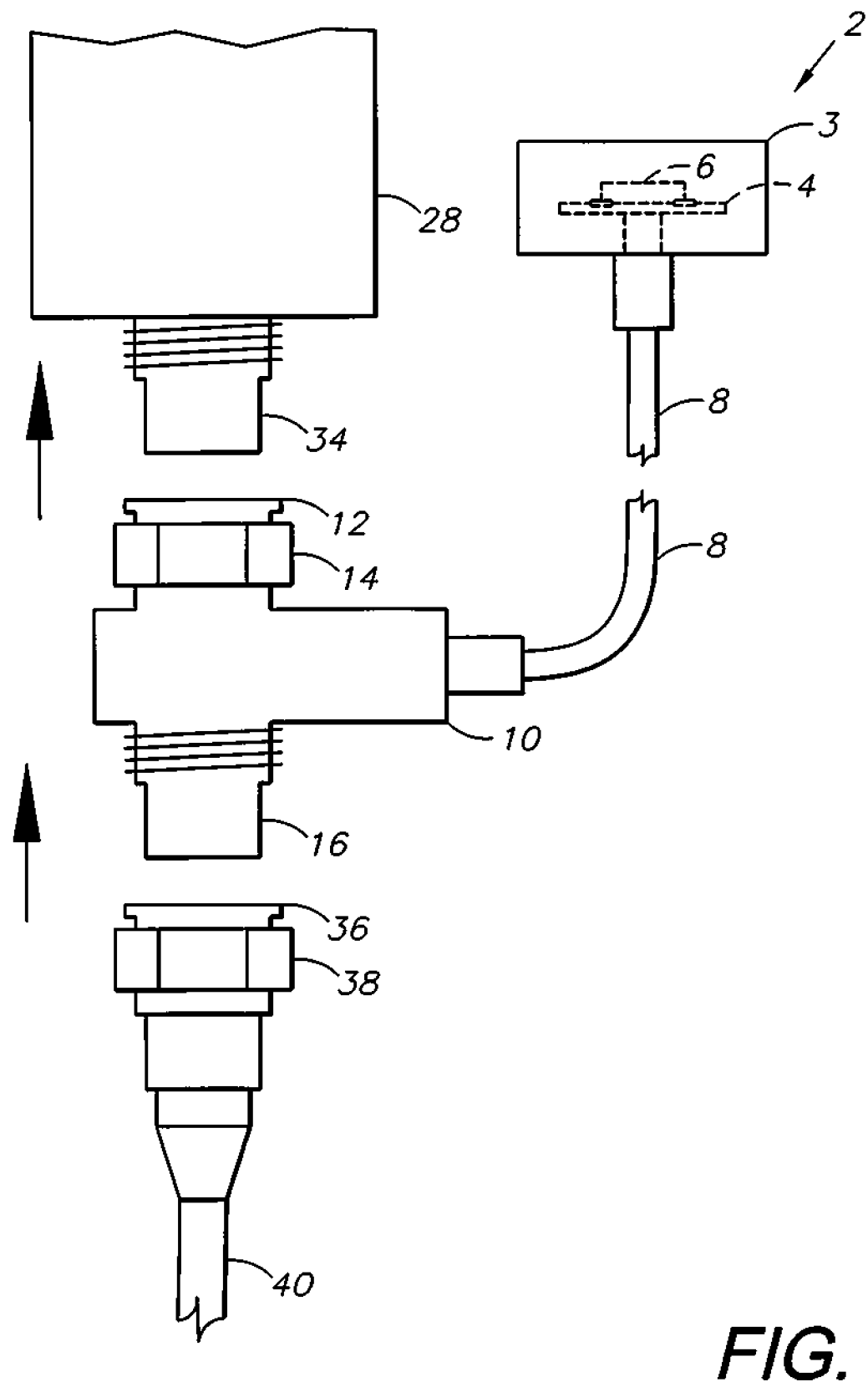
FIG. 2 is a side exploded view of an antenna identification module embodying the principles of the disclosed subject matter connected to an AISG compliant device.

Referring to the drawings in more detail, the reference numeral 2 generally designates an antenna identification module embodying the principles of the disclosed subject matter. Referring to FIG. 1, the module 2 is shown attached to the exterior of an antenna 20. A housing 3 of the module 2 can be attached to a housing of the antenna 20 or related antenna support structure (not shown) with screws, epoxy resin, or any other mechanical method. Referring to FIG. 2, the housing 3 contains a printed circuit board (PCB) 4 connected to an AISG cable splitter 10 through a cable 8 enabling the module 2 to communicate with a network operator through the communications cable 40 using the AISG and 3 GPP protocols. A programmable device 6 mounted on the PCB 4 consists of a microprocessor and a computer memory that stores relevant information pertaining to the antenna 20 such as the serial number, part number, version, firmware, production date, etc. The antenna 20 information can be programmed into the module 2 in the field by a field technician, or by the antenna 20 manufacturer at the factory. The module 2 is designed to be programmed and reprogrammed a specific number of times by a manufacturer or a field technician.

The antenna 20 may contain internal electrical components, such as mechanical and electrical azimuth measurement and control, that have modules capable of transmitting the serial number, part number, version, firmware, production date, etc. associated with the respective internal components to a network operator through the communications cable 40 using the AISG or 3GPP protocol. Communications cables 27 providing date, application and signal transmission attach to the antenna 20 by mating the female AISG compliant connectors 24 of the cables 27 to the male AISG compliant connectors 22 of the antenna 20 and securing them together by tightening a threaded fastening nut 26.

In this embodiment, an AISG compliant device 28, such as a remote electrical tilt module, a remote control unit, or a tower mounted amplifier, is connected to the antenna 28 by mating a female AISG connector 30 of the device 28 to a male AISG connector 22 on the antenna 20, and securing them together by tightening a threaded fastening nut 32. The AISG cable splitter 10 allows the antenna identification module 2 to interface with the communications cable 40, and communicate with a network operator over the attached communications cable 40. The cable splitter 10 connects to the AISG compliant device 28 by mating a female AISG connector 12 on the splitter 10 with a male AISG connector 34 on the device 28, and securing them together by tightening a threaded fastening nut 14. In turn, the communications cable 40 is connected to the AISG cable splitter 10 by mating a female AISG connector 36 on the cable 40 with a male AISG connector 16 on the splitter 10, and securing them together by tightening a threaded fastening nut 38.

III. Alternative Embodiment Antenna Identification Module 52

Figure 3:
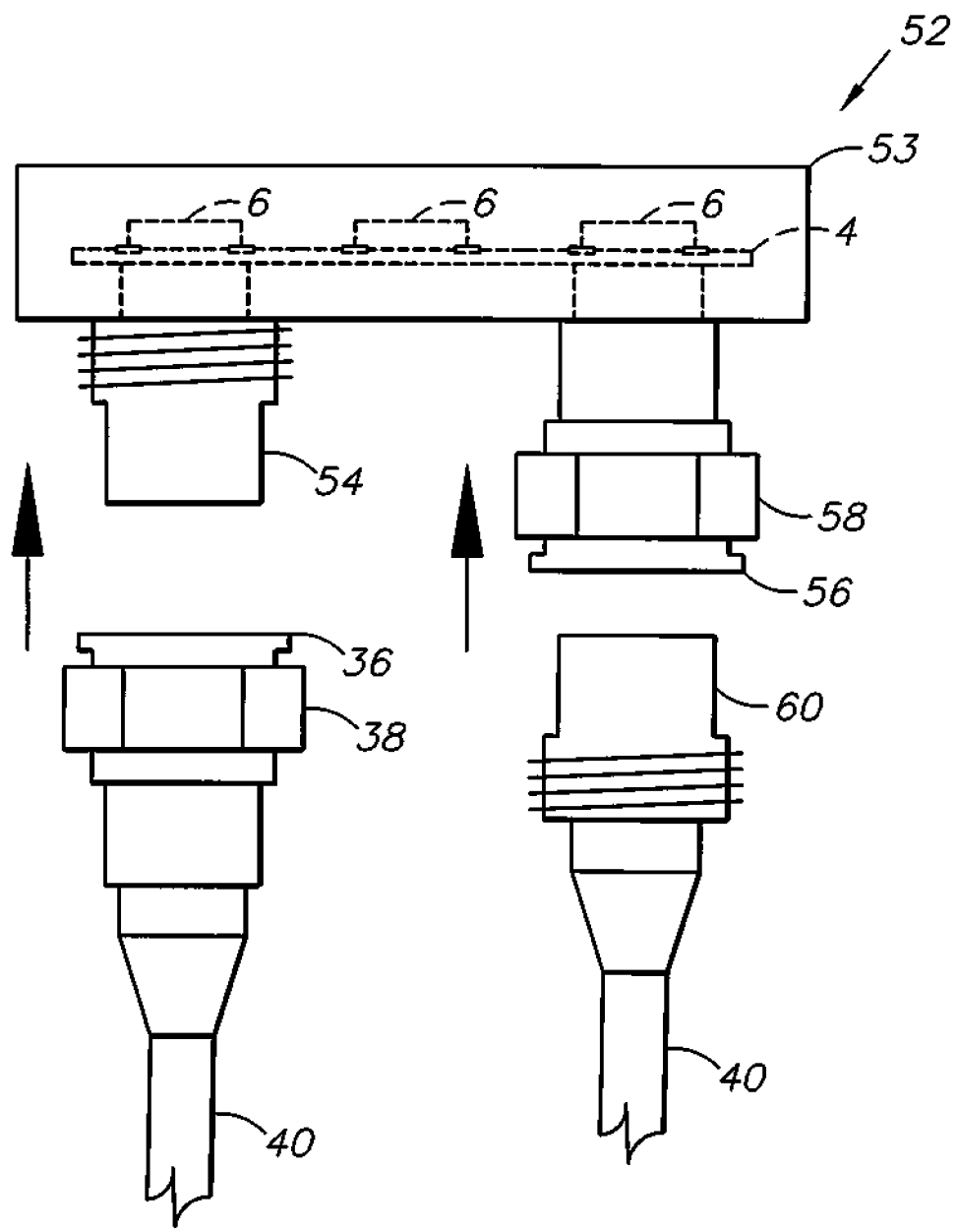
FIG. 3 is an alternative embodiment antenna identification module embodying the principles of the disclosed subject matter.

An antenna identification module 52 comprising another embodiment or aspect of the disclosed subject matter is shown in FIG. 3, and includes a housing 53 containing a PCB 4 with one or more programmable devices 6, with the circuit board 4 being connected to male AISG input connector 54 and a female AISG output connector 56. The module 52 operates in the same manner as the module 2 described above by having programmable devices 6 capable of storing antenna information such as serial number, part number, version, firmware, production date, etc., designed to be programmable and reprogrammable a limited number of times.

The module 52 is connected to communications cables 40 in-line in a daisy chain fashion by securing the female AISG connector 36 to the threaded male AISG input connector 54, and securing them together by tightening the threaded fastening nut 3. The female AISG output connector 56 is connected to a male AISG connector 60 attached to an end of a communications cable 40, and they are secured together by tightening the threaded fastening nut 58. In this embodiment, the cables 40 may connect to the antenna, or an AISG compliant device. As described above, antenna information can be programmed into the module 52 in the field by a field technician, or by the antenna manufacture.

IV. Alternative Embodiment Sensor System 102

Figure 4:
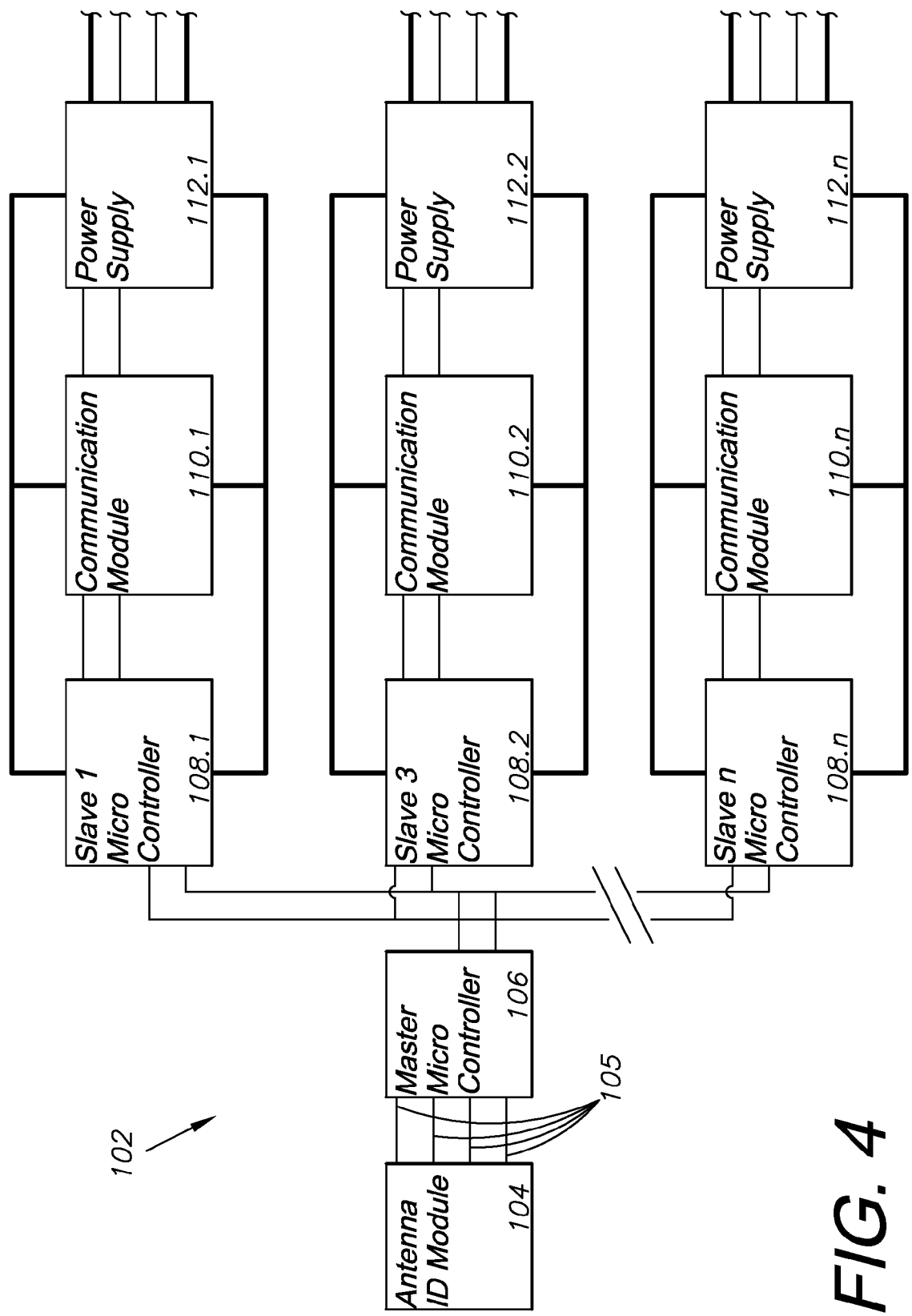
FIG. 4 is a schematic view of an alternative embodiment in-line tilt sensor system in accordance with an embodiment of the present invention wherein multiple antenna protocols are orientated and monitored by a single tilt sensor.
Figure 5:
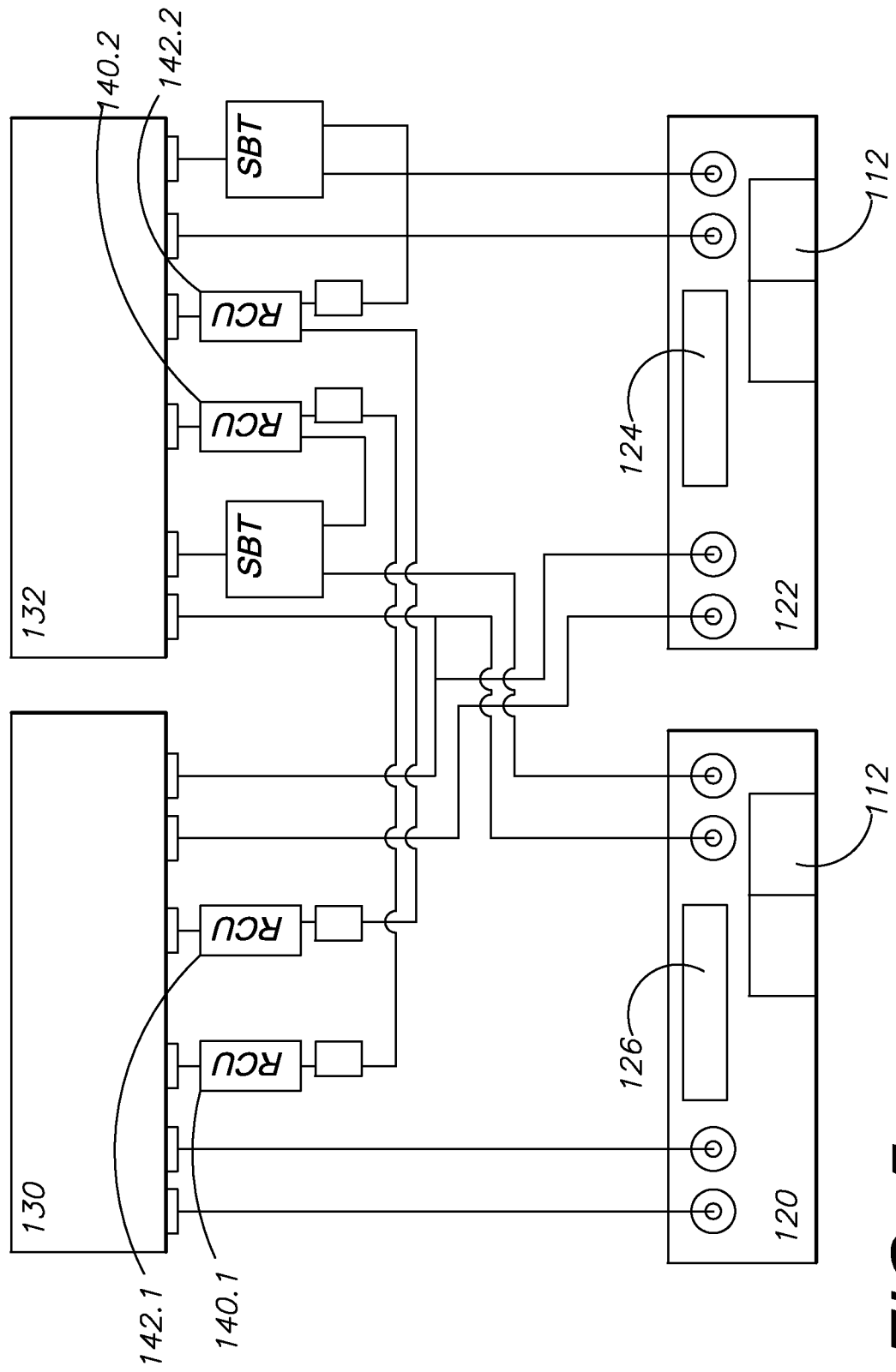
FIG. 5 is a schematic view of the embodiment of FIGS. 1-6 an in-line tilt sensor system using multiple tilt sensors to orient and monitor multiple antenna protocols.
Figure 6:
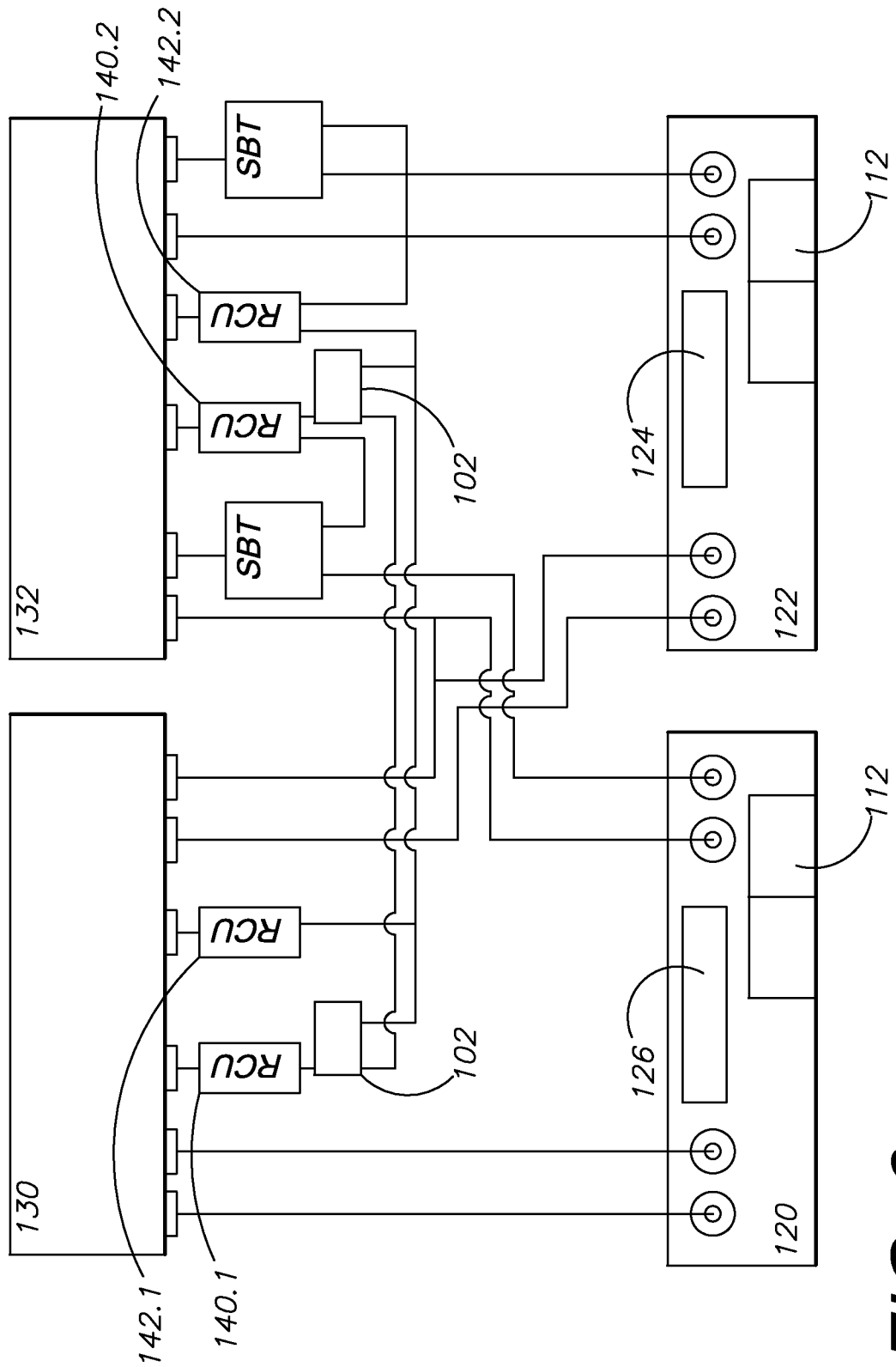
FIG. 6 is a schematic view of the alternative embodiment of an in-line tilt sensor system using a single tilt sensor to orient and monitor multiple antenna protocols.

An antenna identification system 102 comprising yet another embodiment or aspect of the present invention is shown in FIG. 4-6. The previously disclosed embodiments are capable of providing orientation and monitoring service for a single antenna of a single frequency band. In this alternative embodiment, a single inline antenna identification module 104 is capable of monitoring and reporting on an unlimited number of communication ports on an unlimited number of antenna protocols.

The alternative embodiment sensor system 102 is a solution for cellular network carriers which utilize multi-band antennas operating on one or more frequency bands. It is important for the network provider or carrier to know the mechanical tilt and roll of all directional antennas in the network. This is made complicated by multi-band antennas with multiple remote control units (RCUs). The multi-band antenna may have one more RCUs for every frequency band in use.

Each RCU can be controlled by one or more primary controllers (CCU). Such CCU controllers may be installed as a module inside a BTS station, but must also be part of the BTS or antenna transceiver. Identification data can be accessed by either running control cables up the mast or other structure a multi-band antenna is mounted to, or by combining the control signals with the transmitted radio signals over an antenna feeder cable. In this way, the data flow stems from the individual CCU, thus forming separate systems.

The antenna identification module 104 provides multiple individual communication ports 105 for multiple communication protocols. The antenna identification module 104 shares its detected information over the multiple communication ports 105. The antenna identification module 104 feeds into a master micro controller 106, which in turn communications with an unlimited number of slave micro controllers 108, at least one for each communication protocol. These slave controllers 108.1, 108.2, 108.n in turn control the slave communications modules 110.1, 110.2, 110.n, power supplies 112.1, 112.2, 112.n, and other components located in each protocol. Because each protocol contains a separate power supply 112, each protocol will respond as an individual device.

The antenna identification module 104, as described in the previous embodiments, may be a one, two, or three axis accelerometer. The module 104 can communicate its readings across the communication ports 105 to the master controller 106, which then handles each of the unlimited number of slave protocol systems. This allows a single antenna identification module 104 to capably monitor and report on a multi-band antenna no matter the number of protocols used by that antenna or the number of independent antenna motors or busses are included in the multi-band antenna.

FIGS. 5 and 6 together show the difference between the present alternative embodiment and employing the previous embodiment within a multi-frequency antenna system. Two separate transceivers, a high-frequency transceiver 122 and a low frequency transceiver 120, displaying a high frequency signal 124 and a low frequency signal 126, are connected to two antenna bodies 130, 132.

FIG. 6 displays the present alternative embodiment employed on a multi-frequency antenna system. The antenna identification system 102 is communicatively connected to both the low-band RCU 140.1, 140.2 and the high-band RCU 142.1, 142.2. This allows the single tilt sensor system to send communication signals to each individual RCU, and each RCU controls its separate frequency as an isolated system.

It will be appreciated that the components of the antenna identification system assemblies 2, 52, and 102 are AISG and 3rd Generation Partnership Project (3GPP) compliant, and can be used for various other applications. Moreover, the sensor assemblies 2, and 52 can be fabricated in various sizes and from a wide range of suitable materials, using various manufacturing and fabrication techniques.

It will be appreciated that the components of the modules 2, 52 can be used for various other applications. Moreover, the modules 2, 52 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. A method for storing and transmitting data from a communications antenna over AISG and 3 GPP compliant communications systems, wherein the antenna includes a bulkhead connector, the method comprising the steps:
   providing a printed circuit board (PCB) with a microprocessor, data storage device, and related circuitry capable of storing and transmitting programmed antenna information;
   providing mechanical or electrical azimuth measurement devices and suitable controller;
   providing a module housing adapted for housing said PCB, said data storage device, and azimuth measurement devices, said housing capable of connecting to said bulkhead connector;
   combining said PCB, said data storage device, and module housing to form an antenna identification module;
   programming said antenna identification module, said programming performed either in the field by a field technician or at the place of manufacture by the antenna manufacturer;
   wherein said communications antenna is a multi-band antenna with multiple remote electrical tilt (RET) remote control units (RCUs) each associated with multiple frequency bands, said antenna capable of communicating on multiple bands to multiple targets simultaneously;
   providing a plurality of individual communication ports to the antenna identification module, said ports electrically connected to the PCB;
   providing one or more primary controller units (CCUs);
   slaving said RCUs to said at least one CCU;
   providing a power supply to each slaved RCU;
   providing a data communications module to each slaved RCU;
   providing one multi-axis tilt sensor having multiple individual communication ports adapted for measuring tilt and slant of said communications antenna;
   connecting said tilt sensor to one said CCU;
   providing antenna communications cables connected to said tilt sensor;
   connecting said antenna identification module to said communications cables;
   mounting the antenna identification module in-line with said bulkhead connector and perpendicular to the antenna body;
   obtaining antenna identification data using said antenna identification module;
   remotely reporting said identification data to a device with a graphical user interface; and
   detecting antenna identification data from each of said antenna's multiple bands.

2. The method of claim 1, further comprising the steps:
   providing an AISG cable splitter including a first connector and a second connector; and
   connecting the module to the antenna communications cable using said AISG cable splitter.

3. The method of claim 2, wherein:
   said first connector is a "female" type connector; and
   said second connector is a "male" type connector.

4. The method of claim 3, wherein the antenna bulkhead connector includes an existing antenna measurement device, the method including the step:
   connecting the module to said bulkhead connector in-line with said existing antenna measurement device using the AISG cable splitter.

5. The method of claim 1, further comprising the step:
   connecting the antenna identification module to the antenna communications cable in a daisy chain fashion.

6. The method of claim 1, wherein said antenna identification data includes, but is not limited, at least one of the following list:
   antenna serial number;
   antenna part number;
   antenna firmware version;
   antenna production date; and
   antenna installation date.

7. A method for storing and transmitting data from a communications antenna over AISG and 3 GPP compliant communications systems, wherein the antenna includes a bulkhead connector, the method comprising the steps:
   providing a printed circuit board (PCB) with a microprocessor, data storage device, and related circuitry capable of storing and transmitting programmed antenna information;
   providing mechanical or electrical azimuth measurement devices and suitable controller;
   providing a module housing adapted for housing said PCB, storage device, and azimuth measurement devices, said housing capable of connecting to said bulkhead connector;
   combining said PCB, storage device, and module housing to form an antenna identification module;
   programming said module, said programming performed either in the field by a field technician or at the place of manufacture by the antenna manufacturer;
   wherein said communications antenna is a multi-band antenna with multiple remote electrical tilt (RET) remote control units (RCUs) each associated with multiple frequency bands, said antenna capable of communicating on multiple bands to multiple targets simultaneously;
   providing a plurality of individual communication ports to the antenna identification module, said ports electrically connected to the PCB;
   providing one or more primary controller units (CCUs);
   slaving said RCUs to said at least one CCU;
   providing a power supply to each slaved RCU;
   providing a data communications module to each slaved RCU;
   providing one multi-axis tilt sensor having multiple individual communication ports adapted for measuring tilt and slant of said communications antenna;
   connecting said tilt sensor to one said CCU;
   providing antenna communications cables connected to said tilt sensor;
   providing an AISG cable splitter including a first "female" type connector and a second "male" type connector;
   connecting the module to the antenna communications cable using said AISG cable splitter;
   mounting the module in-line with said bulkhead connector and perpendicular to the antenna body;
   obtaining antenna identification data using said module; and
   remotely reporting said identification data to a device with graphical user interface; wherein
   said antenna identification data includes, but is not limited, at least one of the following list: antenna serial number, antenna part number, antenna firmware version, antenna production date, and antenna installation date.

8. The method of claim 7, wherein the antenna bulkhead connector includes an existing antenna measurement device, the method including the step:

connecting the module to said bulkhead connector in-line with said existing antenna measurement device using the AISG cable splitter.

9. A system adapted for connecting to a telecommunications antenna including a bulkhead connector and detecting and reporting antenna identification and information data, the system comprising:
- a printed circuit board (PCB) with a microprocessor and related circuitry;
- a data storage device;
- a mechanical or electrical azimuth measurement devices and suitable controller;
- a weatherproof housing adapted for containing said PCB, said data storage device, and said azimuth measurement device and controller, and capable of being mounted to said telecommunications antenna via said bulkhead connector;
- a remote user interface; and
- a communications cable adapted for connecting said user interface to said PCB, said communications cable including a first and second connector.

10. The system of claim 9, wherein:
the telecommunications antenna bulkhead connector is an eight-pin standardized Antenna Interface Standards Group (AISG) compliant bulkhead connector; and
said communications cable comprises an eight-pin AISG compliant cable connector.

11. The system of claim 9, wherein:
said communications cable first connector is a "female" type connector; and
said communications cable second connector is a "male" type connector.

* * * * *